(12) United States Patent
Aoshima et al.

(10) Patent No.: US 7,934,877 B2
(45) Date of Patent: May 3, 2011

(54) DIAPHRAGM BLADE, METHOD OF MANUFACTURING THE SAME, AND LIGHT QUANTITY CONTROLLER HAVING THE SAME

(75) Inventors: Chikara Aoshima, Zama (JP); Eriko Namazue, Tokyo (JP); Makoto Miyawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 641 days.

(21) Appl. No.: 12/018,102

(22) Filed: Jan. 22, 2008

(65) Prior Publication Data

US 2008/0205880 A1      Aug. 28, 2008

(30) Foreign Application Priority Data

Feb. 23, 2007   (JP) .................................. 2007-044038
Apr. 9, 2007    (JP) .................................. 2007-102062
Jun. 29, 2007   (JP) .................................. 2007-173088

(51) Int. Cl.
*G03B 9/02*      (2006.01)
*G02B 9/08*      (2006.01)
*H04N 5/238*     (2006.01)

(52) U.S. Cl. ......... 396/505; 396/508; 359/739; 348/363

(58) Field of Classification Search .................. 396/510, 396/505, 508; 359/739; 348/363
See application file for complete search history.

(56) References Cited

U.S. PATENT DOCUMENTS

2002/0031353 A1*   3/2002   Naganuma .................... 396/452

FOREIGN PATENT DOCUMENTS

| CN | 1099152 | 2/1995 |
| JP | 6-68595 | 3/1994 |
| JP | 6-317826 | 11/1994 |
| JP | 2005-305906 | 11/2005 |

* cited by examiner

*Primary Examiner* — Rochelle-Ann J Blackman
(74) *Attorney, Agent, or Firm* — Canon USA Inc IP Division

(57) ABSTRACT

A diaphragm blade includes a light-shielding, thin-plate blade base made of laser absorptive resin to regulate an aperture, and a first shaft portion made of laser transmissive resin and provided on one surface of the blade base. The first shaft portion includes a cylindrical member which is welded to the protruding weld portion, a protruding weld portion integrally formed with the blade base, and a recess formed at the back side of the protruding weld portion. The cylindrical member has a first recess defined at one end thereof near the blade base and coming into contact with the protruding weld portion, and a second recess defined at the other end. A contact surface of the protruding weld portion is melted with laser beam transmitted through the cylindrical member, whereby the protruding weld portion is welded to the cylindrical member.

13 Claims, 9 Drawing Sheets

DIAPHRAGM BLADE, METHOD OF MANUFACTURING THE SAME, AND LIGHT QUANTITY CONTROLLER HAVING THE SAME

BACKGROUND OF THE INVENTION

1. Field of the Invention

The present invention relates to diaphragm blades used for optical apparatuses such as film cameras, video cameras, and digital cameras, a method of manufacturing the diaphragm blades, and a light quantity controller having the diaphragm blades.

2. Description of the Related Art

Cameras, such as video cameras and digital cameras, having solid-state image pickup elements and cameras using films usually have diaphragm devices (light quantity controllers) that control an aperture diameter to check a depth of focus of a lens, and to control the light quantity of an object focused on a film or a solid-state image pickup element. Also, optical apparatuses that project images may have light quantity controllers. Such light quantity controllers typically include a type in which a plurality of light-shielding blades (diaphragm blades) are used to change an aperture diameter around an optical axis like an iris, and a type in which two diaphragm blades are relatively moved in opposite directions to change an aperture diameter.

The former type can continuously change the aperture diameter, and hence, a desired aperture diameter can be obtained. However, to obtain an aperture approximate to a circle, it is necessary to increase the number of diaphragm blades, thereby increasing the cost.

On the other hand, the latter type uses a small number of diaphragm blades, and thus can save costs. However, it is difficult to obtain an aperture approximate to a circle.

The diaphragm blades usually have light-shielding blade bases and shaft portions for rotation of the blade bases.

To form a shaft at a blade, hitherto, a metal shaft is arranged at a sheet metal or a plastic sheet by mechanical caulking, or resin is provided at a blade sheet by outset molding. These methods require a large number of man hours, and have problems in reliability. In addition, a caulking mark of the shaft, or a blade attaching portion at the shaft due to the outset molding may protrude from the back side of the blade with the shaft, and the caulking mark or blade attaching portion may be hooked to a plate when the blade is driven.

In light of this, as shown in FIG. 14A, Japanese Patent Laid-Open No. 6-317826 suggests a diaphragm blade 60 having a blade substrate 61 made of synthetic resin, and protruding engagement portions 62 and 63, the blade substrate 61 being integrally formed with the protruding engagement portions 62 and 63 by injection molding. Hence, the number of man hours for manufacturing the diaphragm blades, and the manufacturing cost can be markedly reduced.

Also, as shown in FIG. 14B, Japanese Patent Publication No. 6-68595 suggests an exposure control blade 70 manufactured such that a notch is formed at a dowel-holding position of a blade, a blade is conveyed to a die of injection molding for molding a dowel at the blade, the notch is pushed upward by a part of the die to protrude into a cavity of the die during clamping of the blade, and the notch is covered with and held by resin of the dowel when the dowel is injection-molded. Hence, the resin can cover and hold the dowel at the notch without making a hole in the diaphragm blade, or in a shutter blade, thereby increasing a dowel-holding strength.

However, with the above-described diaphragm blade, the thickness of the shaft portion is larger than the thickness of the blade base, and thus, flowability of the resin during the injection molding may be small, or the shaft portion may be deformed. This may deteriorate dimensional accuracy of the shaft portion. The problem becomes more noticeable as the thickness of the blade base is reduced. In contrast, if the thickness of the blade base is increased, a load during drive of the blade may become large. The blade driver such as a motor has to be increased in size accordingly, and as a result, the entire apparatus may become large.

SUMMARY OF THE INVENTION

The present invention provides a diaphragm blade, a method of manufacturing the diaphragm blade, and a light quantity controller having the diaphragm blade, capable of reducing the size of the apparatus and increasing its dimensional accuracy.

An aspect of the present invention includes a thin-plate blade member, and a shaft member provided at least on one surface of the blade member. The blade member is made of laser absorptive resin, whereas the shaft member is made of laser transmissive resin. The blade member is welded to the shaft member with laser beam transmitted through the shaft member.

Further features of the present invention will become apparent from the following description of exemplary embodiments with reference to the attached drawings.

BRIEF DESCRIPTION OF THE DRAWINGS

FIG. 8A is a cross-sectional view showing the first shaft portion near a protruding weld portion. FIG. 8B is a cross-sectional view showing the cylindrical member.

FIG. 9A shows a first step, FIG. 9B shows a second step, and FIG. 9C shows a third step.

FIG. 14A shows a first related art, and FIG. 14B shows a second related art.

DESCRIPTION OF THE EMBODIMENTS

First Embodiment

Figure 1:
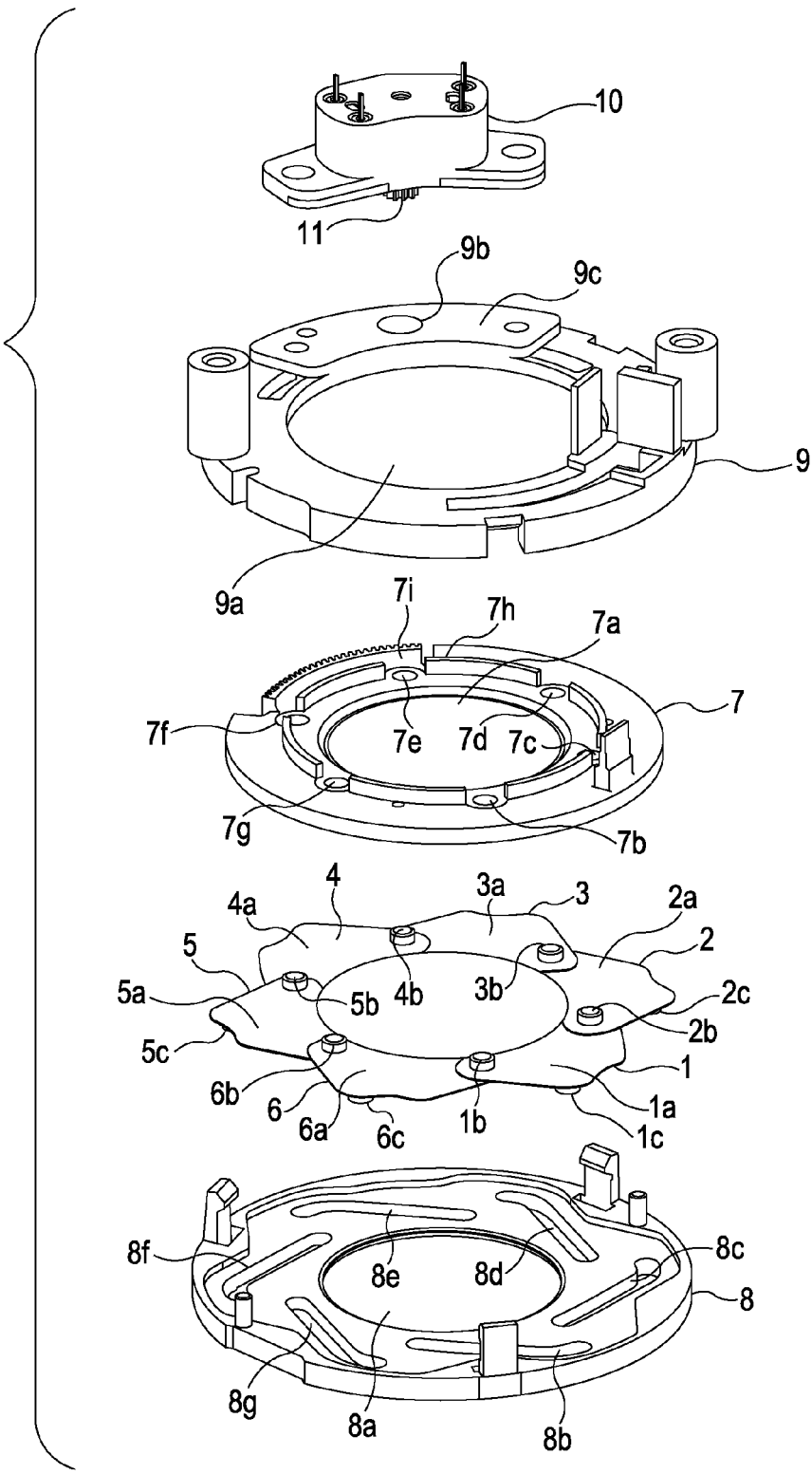
FIG. 1 is an exploded perspective view schematically showing a configuration of a light quantity controller having diaphragm blades according to an embodiment of the present invention.

FIG. 1 is an exploded perspective view schematically showing a configuration of a light quantity controller having diaphragm blades according to a first embodiment of the present invention.

In FIG. 1, diaphragm blades 1, 2, 3, 4, 5, and 6 are provided. The diaphragm blade 1 includes a thin-plate blade base (blade member) 1a that regulates an aperture of an optical path, a first shaft portion 1b provided on one surface of the blade base 1a to regulate motion of the blade base 1a, and a second shaft portion 1c provided on the other surface of the blade base 1a to regulate the motion of the blade base 1a. Like the diaphragm blade 1, the diaphragm blades 2 to 6 respectively include blade bases 2a to 6a, first shaft portions 2b to 6b, and second shaft portions 2c to 6c (though some of them are not shown). The configurations of the diaphragm blades 2 to 6 are similar to that of the diaphragm blade 1, and hence, their descriptions are omitted.

A rotary member 7 is ring-shaped, and has an opening 7a at the center. The rotary member 7 includes shaft holes 7b to 7g, a rotary fitting protrusion 7h divided into six parts, and a gear 7i.

A cam member 8 is ring-shaped, and has an opening 8a at the center. The cam member 8 includes cam grooves 8b to 8g.

A press member 9 is ring-shaped, and has an opening 9a at the center. The press member 9 includes a hole 9b and a motor attaching portion 9c.

A stepping motor 10 drives the rotary member 7. A pinion gear 11 is fixed to a tip of a shaft of the stepping motor 10, and is attached to the motor attaching portion 9c of the press member 9. The pinion gear 11 penetrates through the hole 9b of the press member 9, and meshes with the gear 7i of the rotary member 7.

The press member 9 is fixed to the cam member 8 with the rotary member 7 and the diaphragm blades 1 to 6 interposed therebetween, so as to prevent the rotary member 7 and the diaphragm blades 1 to 6 from being detached in an optical axis direction. At this time, the rotary fitting protrusion 7h of the rotary member 7 is fitted to the opening 9a of the press member 9, and is rotatably supported thereby. The first shaft portions 1b to 6b of the diaphragm blades 1 to 6 are respectively rotatably fitted to the shaft holes 7b to 7g of the rotary member 7. The second shaft portions 1c to 6c are respectively slidably fitted to the cam grooves 8b to 8g of the cam member 8.

The diaphragm blades 1 to 6 are circumferentially and evenly arranged around the optical axis. The blade bases 1a to 6a are superposed on one another, and thus, the aperture of the diaphragm can be controlled. As the superposed area increases, the aperture of the diaphragm decreases.

When the stepping motor 10 drives, the pinion gear 11 rotates, and the rotary member 7 is rotated corresponding to the rotation of the pinion gear 11. The rotation of the rotary member 7 allows the first shaft portions 1b to 6b of the diaphragm blades 1 to 6 to move, and allows the second shaft portions 1c to 6c to move along the cam grooves 8b to 8g of the cam member 8. The six diaphragm blades 1 to 6 rotate in a similar manner, whereby the state of the aperture is continuously changed between a full-open state in which the diaphragm blades 1 to 6 are retracted from the opening 8a of the cam member 8, and a stop-down state in which the diaphragm blades 1 to 6 are inserted to the opening 8a of the cam member 8. That is, the diameter of the aperture of the diaphragm is changed, and thus, the quantity of light beam (light quantity) can be controlled by controlling the stepping motor 10.

Next, the relationship between the blade base and the shaft portion of the diaphragm blade according to the first embodiment is described in detail.

Figure 2:
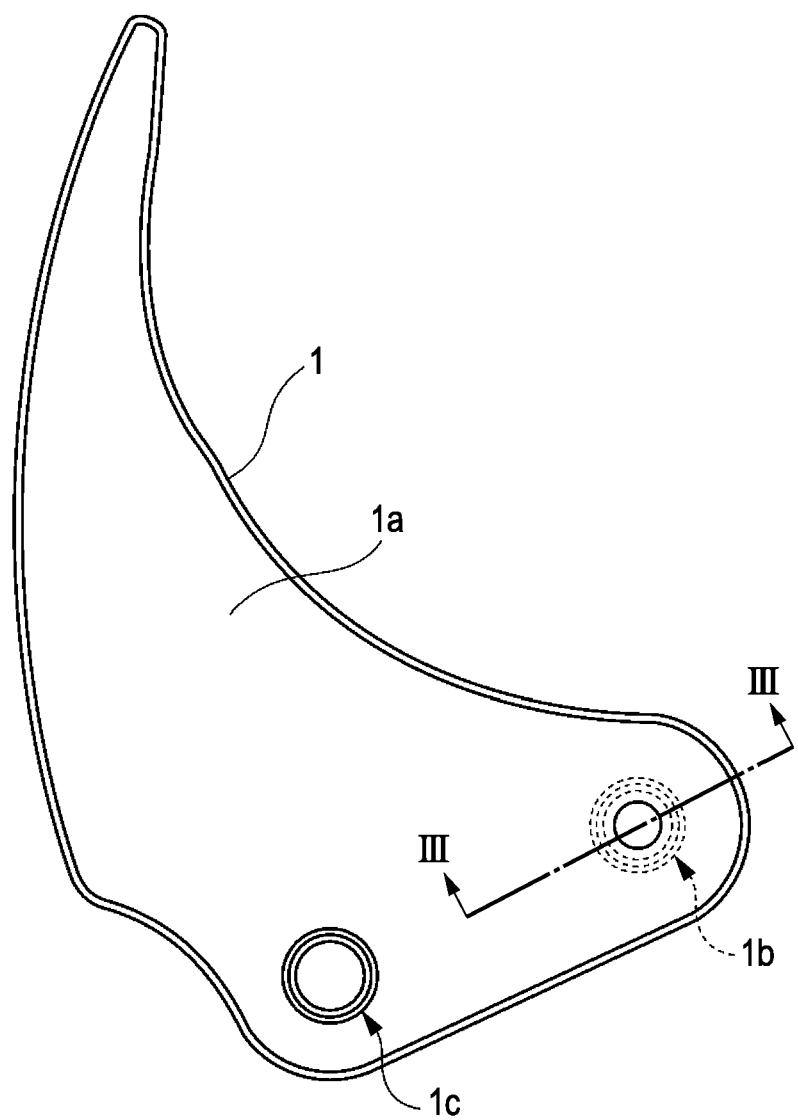
FIG. 2 is a plan view showing a diaphragm blade according to a first embodiment.
Figure 3:
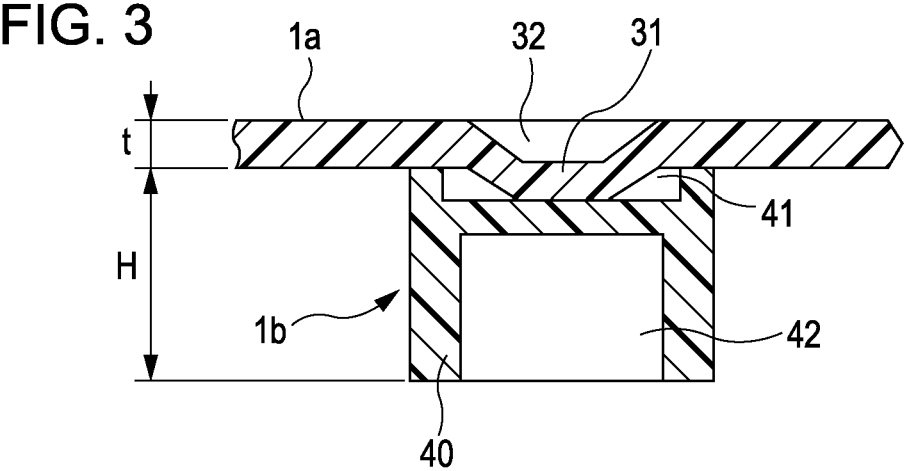
FIG. 3 is a fragmentary cross-sectional view showing the diaphragm blade according to the first embodiment, taken along a line III-III in FIG. 2.

FIG. 2 is a plan view showing the diaphragm blade 1 in FIG. 1. FIG. 3 is a fragmentary cross-sectional view showing the diaphragm blade 1 taken along a line III-III in FIG. 2. The relationship between the blade base 1a and the first shaft portion 1b is described below with reference to FIGS. 2 and 3. The relationships between other blade bases 2a to 6a and the first shaft portions 2b to 6b, and the relationships between the blade bases 2a to 6a and the second shaft portions 2c to 6c are similar to the above example relationship, and hence, the descriptions are omitted.

FIGS. 2 and 3 show the shape of the first shaft portion 1b after irradiation of laser beam, or the state in which the first shaft portion 1b is integrated with the blade base 1a. Before the irradiation of the laser beam, the first shaft portion 1b is composed of a protruding weld portion 31 to which a cylindrical member 40 (described later) is welded, a recess 32 formed at the back side of the protruding weld portion 31, and the cylindrical member (protruding member) 40 which is welded to the protruding weld portion 31.

The cylindrical member 40 has a first recess 41 defined at one end of the cylindrical member 40 near the blade base 1a and coming into contact with the protruding weld portion 31, and a second recess 42 defined at the other end. Since the cylindrical member 40 has the second recess 42, the laser beam is easily transmitted and easily melts the protruding weld portion 31.

To weld the cylindrical member 40 to the blade base 1a, first, the cylindrical member 40 is positioned at the protruding weld portion 31 of the blade base 1a, and a piece of transparent glass (not shown) serving as a press plate is arranged at the cylindrical member 40 on the second recess 42 side. The cylindrical member 40 is pressure-welded to the blade base 1a by the transparent glass. The periphery of the cylindrical member 40 is covered with a mask that does not transmit the laser beam. Since the periphery of the cylindrical member 40 is covered with the mask, only a required area can be irradiated with the laser beam.

Next, the laser beam is emitted to the blade base 1a from the second recess 42 side of the cylindrical member 40. The laser beam emitted from the second recess 42 side is transmitted through the cylindrical member 40, reaches the protruding weld portion 31 of the blade base 1a, and then is absorbed. At this time, the laser beam absorbed at a contact surface where the first recess 41 of the cylindrical member 40 is in contact with the protruding weld portion 31 of the blade base 1a is accumulated as energy. Hence, the contact surface of the protruding weld portion 31 is heated and melted, and the contact surface of the first recess 41 of the cylindrical member 40 is heated and melted because the heat is transmitted from the weld surface of the blade base 1a. Accordingly, the blade base 1a is integrally welded to the cylindrical member 40.

The height H of the cylindrical member 40 is, for example, 0.8 mm, and the thickness t of the blade base 1a is, for example, 0.14 mm (FIG. 3). The thickness t of the blade base 1a, which is made of laser absorptive resin, is noticeably smaller than the height H of the cylindrical member 40, which is made of laser transmissive resin; the blade base 1a is easily thermally affected by the laser irradiation and is sensitive to the laser irradiation. If the energy of the laser beam is excessively large, a hole may be made in the blade base 1a, and the heat quantity transmitted to the cylindrical member 40 may increase. Due to this, the melted amount of the cylindrical member 40 may increase, and it is difficult to keep the dimensional accuracy. In contrast, if the energy of the laser beam is excessively small, welding may become incomplete. Thus, it is necessary to weld the cylindrical member 40 to the blade base 1a without the blade base 1a and the cylindrical member 40 being deformed, and is also necessary to obtain a good melted state with a given welding force.

In this embodiment, the blade base 1a is made of laser absorptive resin. For example, the laser absorptive resin is a material mainly composed of polyethylene terephthalate (PET) containing black paint, carbon, or the like. The cylindrical member 40 is made of laser transmissive resin. For example, the laser transmissive resin is composed of polycarbonate (PC) containing a glass material. The blade base 1a and the cylindrical member 40 are welded by irradiating the blade base 1a with the laser beam. A melting point of the laser transmissive resin is lower than a melting point of the laser absorptive resin. In addition, the difference between the melting point of the laser transmissive resin and that of the laser absorptive resin may be less than 20° C.

In this embodiment, the blade base 1a is made of the laser absorptive resin, whereas the cylindrical member 40 provided on the one surface of the blade base 1a is made of the laser transmissive resin, and the blade base 1a and the cylindrical member 40 are welded with the laser beam transmitted through the cylindrical member 40. Also, the melting point of the laser transmissive resin is lower than that of the laser absorptive resin. Accordingly, the blade base 1a and the cylindrical member 40 can be welded by the laser irradiation, the blade base 1a and the cylindrical member 40 can be welded without the blade base 1a and the cylindrical member 40 being deformed, and a good melted state with a given welding force can be obtained. Thus, the strength of the protruding member can be maintained, the dimensional accuracy of the protruding member can be increased, and the manufacturing cost can be reduced.

In this embodiment, while the laser absorptive resin is made of the material mainly composed of polyethylene terephthalate containing black paint, carbon, or the like, however, it is not limited thereto. The laser absorptive resin may be made of a material mainly composed of PC resin or ABS resin containing black paint, carbon, or the like.

Also, while the laser transmissive resin is made of polycarbonate containing a glass material, it is not limited thereto. The laser transmissive resin may be made of a material mainly composed of polycarbonate containing a glass material. Alternatively, the laser transmissive resin may be made of colorless or transparent POM resin containing a glass material.

In this embodiment, while the cylindrical member 40 has the first recess 41 defined in the one end of the cylindrical member 40 near the blade base 1a and coming into contact with the protruding weld portion 31, and the second recess 42 defined in the other end, it is not limited thereto. The cylindrical member 40 may have only the first recess 41 defined in the one end of the cylindrical member 40 near the blade base 1a and coming into contact with the protruding weld portion 31.

Also, in this embodiment, while the height H of the cylindrical member 40 is 0.8 mm, and the thickness t of the blade base 1a is 0.14 mm, these dimensions may be changed as usage.

Next, welding properties of the blade base 1a and the cylindrical member 40 of the diaphragm blade 1 according to the first embodiment are described below.

Materials were selected for the laser transmissive resin and the laser absorptive resin so as to meet the condition of (melting point of laser transmissive resin)<(melting point of laser absorptive resin), and the condition of 0° C.<(melting point of laser absorptive resin)−(melting point of laser transmissive resin)<20° C. That is, materials with a melting point of laser transmissive resin lower than a melting point of laser absorptive resin, and with the difference therebetween being less than 20° C., were combined. In particular, a cylindrical member made of polycarbonate (melting point=245° C.) containing a glass material, and a blade base made of a material mainly composed of polyethylene terephthalate (melting point=255° C.) containing a carbon material, were fabricated. Then, the contact surface between the blade base and the cylindrical member was irradiated with semiconductor laser for one (1) second, and the weld surface was formed. The laser output for the irradiation time of this one (1) second was varied, and the melted states of the blade base and the cylindrical member were observed for each of the varied laser outputs. The result of the observation is shown in Table 1.

TABLE 1

|  | Laser output (W) | | | | | | | |
| --- | --- | --- | --- | --- | --- | --- | --- | --- |
|  | 11.0 | 12.0 | 13.0 | 14.0 | 15.0 | 16.0 | 17.0 | 18.0 |
| Melted state of cylindrical member | Δ | Δ | Δ | Δ | ◯ | ◯ | X | X |
| Melted state of blade base | Δ | Δ | Δ | ◯ | ◯ | ◯ | X | X |
| Result of observation | NG | NG | NG | NG | OK | OK | NG | NG |

Irradiation time: 1 second, cylindrical member: PC containing glass, blade base: PET In Table 1, "Δ" represents that the melted state at the weld surface of each part was insufficient, "X" represents the occurrence of deformation, expansion, or perforation in each part except the weld surface because of the excessively melted state, and "◯" represents a good state in which the melted state at the weld surface of each part was sufficient with a given welding force. In the result of the observation, "OK" represents that laser welding with resin was successfully accomplished, and "NG" represents that the laser welding with resin was unsuccessfully accomplished.

As shown in Table 1, the melted state at the contact surface of the cylindrical member was insufficient with the laser output of 14 W or lower, and was sufficient with the laser output ranging from 15 to 16 W. With the laser output of 17 W or higher, the melted state was excessive, and deformation, expansion, or perforation occurred. The melted state of the blade base was insufficient with the laser output of 13 W or lower, and was sufficient with the laser output ranging from 14 to 16 W. With the laser output of 17 W or higher, the melted sate was excessive, and perforation occurred.

Referring Table 1, if the laser output ranges from 15 to 16 W for the irradiation time of one (1) second, the melted states of both the cylindrical member and the blade base became sufficient, thereby successfully accomplishing the laser welding with resin.

Figure 4:
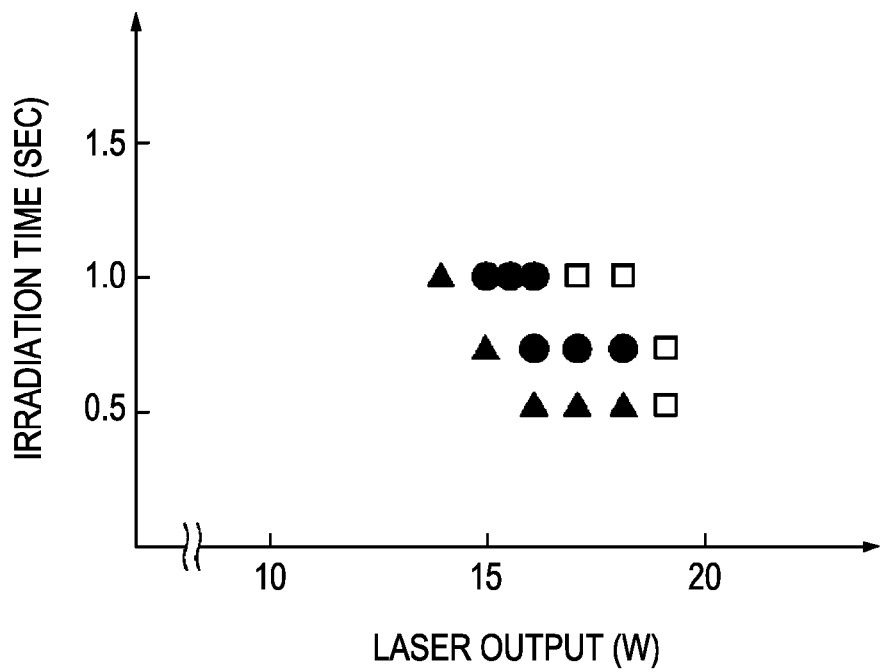
FIG. 4 is a graph showing a melted state when an irradiation time is varied and a laser output is varied for each irradiation time.

Next, FIG. 4 shows the melted state when the irradiation time was varied (0.7 second and 0.5 second), and the laser output was varied for each irradiation time. Note that FIG. 4 plots "white square" for representing an excessively melted state, and "black triangle" for representing an insufficiently melted state.

As shown in FIG. 4, when the irradiation time was set to 0.5 second, the melted state was insufficient with the laser output of 18 W or lower (plotted with "black triangle"). With the laser output of 19 W or higher, the cylindrical member 40 was deformed (plotted with "white square").

When the irradiation time was set to 0.7 second, the melted state was insufficient with the laser output of 15 W or lower (plotted with "black triangle"). With the laser output of 19 W or higher, the cylindrical member 40 was deformed (plotted with "white square b"). In contrast, with the laser output ranging from 16 to 18 W, the cylindrical member 40 and the blade base 1a were welded without the cylindrical member 40 being deformed, and the good melted state with a given welding force could be obtained (plotted with "white square").

When the irradiation time was set to 1.0 second, the melted state was insufficient with the laser output of 14 W or lower (plotted with "black triangle"). With the laser output of 17 W or higher, the cylindrical member 40 was deformed (plotted with "white square"). In contrast, with the laser output ranging from 15 to 16 W, the cylindrical member 40 and the blade base 1a were welded without the cylindrical member 40 being deformed, and an area including the good melted state with a given welding force could be obtained (plotted with "black circle").

Referring to FIG. 4, the laser welding with resin between the cylindrical member and the blade base can be performed under the conditions in which the melting point (245° C.) of the laser transmissive resin is lower than the melting point (255° C.) of the laser absorptive resin, the difference therebetween is less than 20° C., and the laser output ranges from 15 to 16 W for the irradiation time of 1.0 second. Also, the laser welding with resin between the cylindrical member and the blade base can be performed with high dimensional accuracy under the conditions in which the melting point of the laser transmissive resin is lower than the melting point of the laser absorptive resin, the difference therebetween is less than 20° C., and the laser output ranges from 18 to 16 W for the irradiation time of 0.7 second.

Next, as a comparative example, a blade base made of a material mainly composed of polyethylene terephthalate (melting point=255° C.) containing a carbon material, and a cylindrical member made of polycarbonate (melting point=225° C.) were fabricated. In particular, this comparative example is different from the above example only in that the polycarbonate for the cylindrical member does not contain a glass member. The contact surface between the blade base and the cylindrical member was irradiated with semiconductor laser for one (1) second, and the weld surface was formed. The laser output for the irradiation time of this one (1) second was varied, and the melted states of the blade base and the cylindrical member were observed for each of the varied laser outputs. The result of the observation is shown in Table 2.

TABLE 2

| | Laser output (W) | | | | | | | |
|---|---|---|---|---|---|---|---|---|
| | 11.0 | 12.0 | 13.0 | 14.0 | 15.0 | 16.0 | 17.0 | 18.0 |
| Melted state of cylindrical member | Δ | ◯ | ◯ | X | X | X | X | X |

TABLE 2-continued

| | Laser output (W) | | | | | | | |
|---|---|---|---|---|---|---|---|---|
| | 11.0 | 12.0 | 13.0 | 14.0 | 15.0 | 16.0 | 17.0 | 18.0 |
| Melted state of blade base | Δ | Δ | Δ | ◯ | ◯ | ◯ | X | X |
| Result of observation | NG | NG | NG | NG | NG | NG | NG | NG |

Irradiation time: 1 second, cylindrical member: PC, blade base: PET

In Table 2, "Δ" represents that the melted state at the weld surface of each part was insufficient, "X" represents the occurrence of deformation, expansion, or perforation in each part except the weld surface because of the excessively melted state, and "◯" represents a good state where the melted state at the weld surface of each part was sufficient with a given welding force. In the result of the observation, "OK" represents that laser welding with resin was successfully accomplished, and "NG" represents that the laser welding with resin was unsuccessfully accomplished.

As shown in Table 2, the melted state at the contact surface of the cylindrical member was insufficient with the laser output of 11 W or lower, and was sufficient with the laser output ranging from 12 to 13 W. With the laser output of 14 W or higher, the melted state was excessive, and deformation, expansion, or perforation occurred. The melted state of the blade base was insufficient with the laser output of 13 W or lower, and was sufficient with the laser output ranging from 14 to 16 W. With the laser output of 17 W or higher, the melted sate was excessive, and perforation occurred. Referring to Table 2, the melted states of both the cylindrical member and the blade base were not sufficient through only the control of the laser output, and hence, the good melted state could not be obtained.

Figure 5:
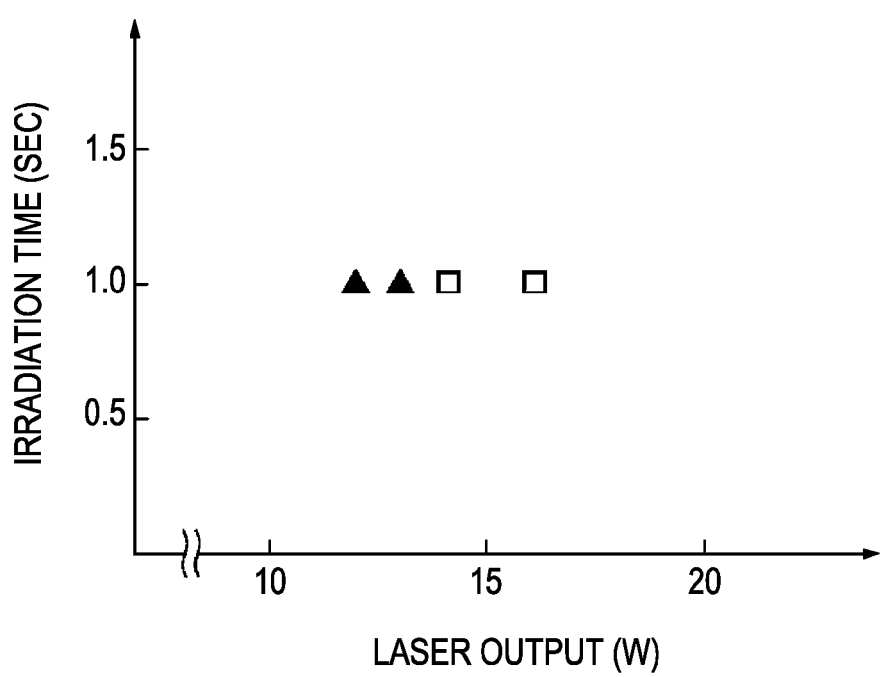
FIG. 5 is a graph showing a melted state when a laser output is varied for an irradiation time of 1 second.

FIG. 5 is a graph showing a melted state in which a laser output for the irradiation time of one (1) second was varied. Note that FIG. 5 plots "white square" for representing an excessively melted state, and "black triangle" for representing an insufficiently melted state.

As shown in FIG. 5, the heat quantity transmitted to the cylindrical member 40 became large with the laser output of 14 W or higher, and deformation, expansion, or perforation occurred in the cylindrical member 40 (plotted with "white square" in the drawing). In contrast, welding was insufficient with the laser output of 13 W or lower (plotted with "black triangle").

Therefore, in this comparative example, an area in the good melted state in which the cylindrical member 40 and the blade base 1a are welded with a given welding force could not be obtained.

Second Embodiment

A light quantity controller having diaphragm blades according to a second embodiment of the present invention is described. The light quantity controller of the second embodiment is different from the light quantity controller of the first embodiment only for the diaphragm blades. The basic configuration of the light quantity controller of the second embodiment is similar to that shown in FIG. 1, and hence, the description is omitted.

Hereinafter, the relationship between a blade base 101a and a first shaft portion 101b of a diaphragm blade 101 according to the second embodiment is described in detail.

Figure 6:
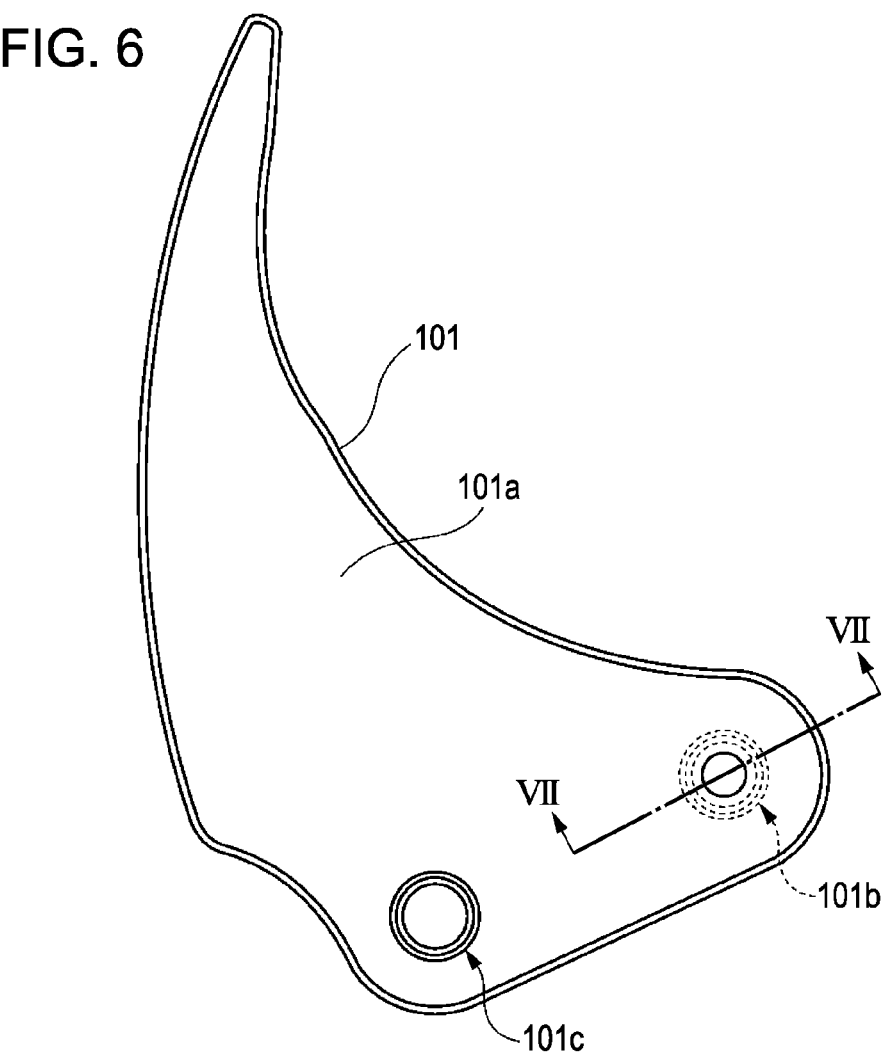
FIG. 6 is a plan view showing a diaphragm blade according to a second embodiment.
Figure 7:
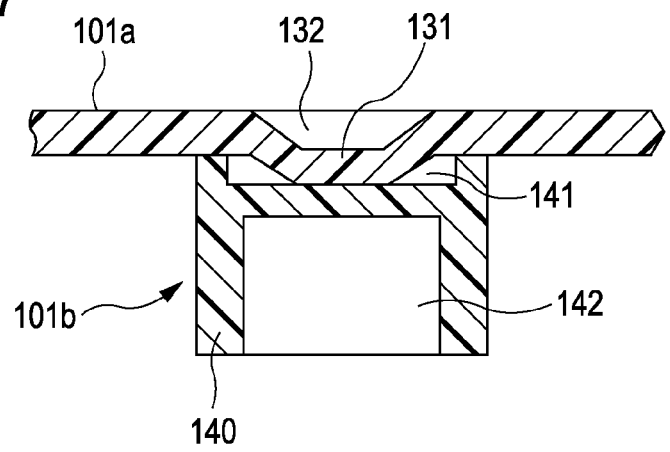
FIG. 7 is a fragmentary cross-sectional view showing the diaphragm blade according to the second embodiment, taken along a line VII-VII in FIG. 6.

FIG. 6 is a plan view showing the diaphragm blade 101 applied to the configuration in FIG. 1. FIG. 7 is a fragmentary cross-sectional view showing the diaphragm blade 101 taken along a line VII-VII in FIG. 6. Referring to FIGS. 6 and 7, the relationship between the blade base 101a and the first shaft portion 101b is described below.

In FIGS. 6 and 7, the first shaft portion 101b includes a protruding weld portion 131 integrally formed with the blade base 101a and to which a cylindrical member 140 (described later) is welded, a recess 132 formed at the back side of the protruding weld portion 131, and the cylindrical member 140 (shaft member) that is welded to the protruding weld portion 131.

The blade base 101a is made of laser absorptive resin, such as PET resin, PC resin, or ABS resin containing black paint, carbon, or the like. The cylindrical member 140 is made of laser transmissive resin, such as colorless or transparent POM resin, or PC resin, such resin likely transmitting laser beam.

The cylindrical member 140 has a first recess 141 defined at one end of the cylindrical member 140 near the blade base 101a and coming into contact with the protruding weld portion 131 (protrusion), and a second recess 142 defined at the other end. Since the cylindrical member 140 has the second recess 142, the laser beam is easily transmitted, and easily melts the protruding weld portion 131.

Figure 8A:
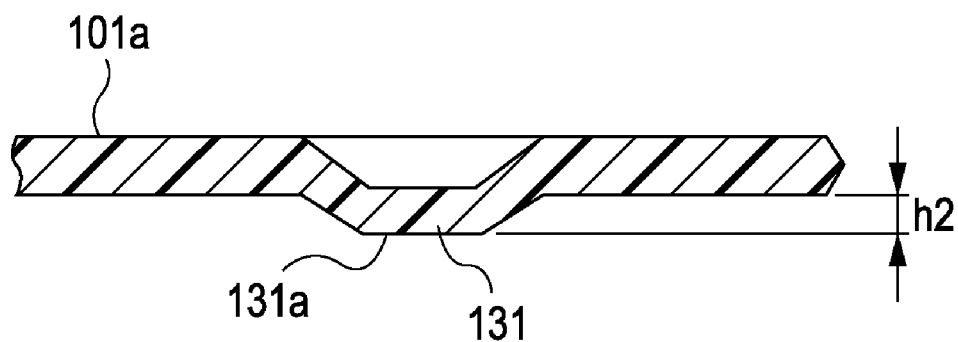
FIGS. 8A and 8B separately illustrate a first shaft portion and a cylindrical member.
Figure 8B:
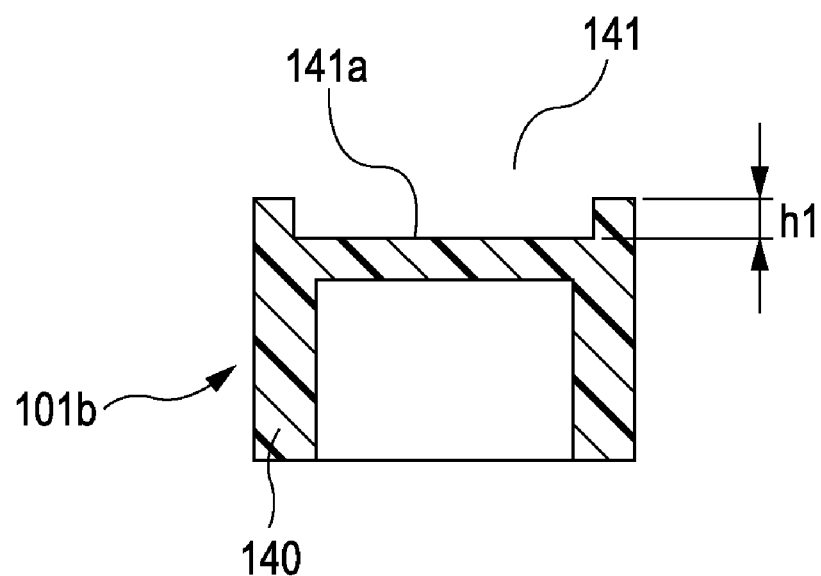

FIGS. 8A and 8B separately illustrate the first shaft portion 101b and the cylindrical member 140. FIG. 8A is a cross-sectional view showing the first shaft portion 101b near the protruding weld portion 131. FIG. 8B is a cross-sectional view showing the cylindrical member 140.

As shown in FIG. 8A, the protruding weld portion 131 has a contact surface 131a (first contact surface) that comes into contact with the cylindrical member 140, whereas the cylindrical member 140 has a contact surface 141a (second contact surface) that comes into contact with the protruding weld portion 131. Assuming that h2 is a protruding length of the protruding weld portion 131 (length from the principal surface of the blade base 101a to the contact surface 131a), and h1 is a recessed depth of the first recess 141 (depth from the end surface of the cylindrical member 140 to the contact surface 141a), the depth h1 and the protruding length h2 satisfy the relationship of h1>h2.

Figure 9A:
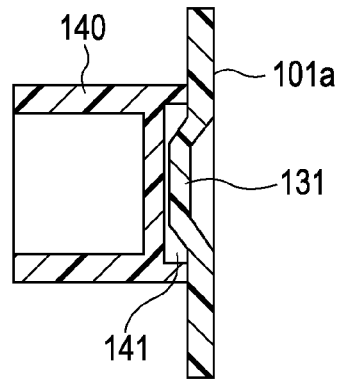
FIGS. 9A to 9D illustrate a method of forming the first shaft portion of the diaphragm blade according to the second embodiment.
Figure 9B:
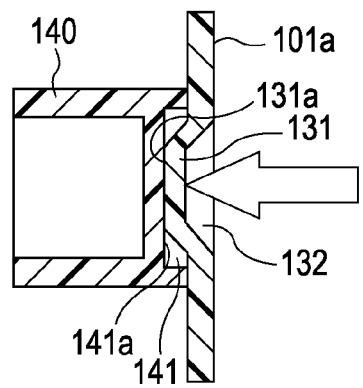
Figure 9C:
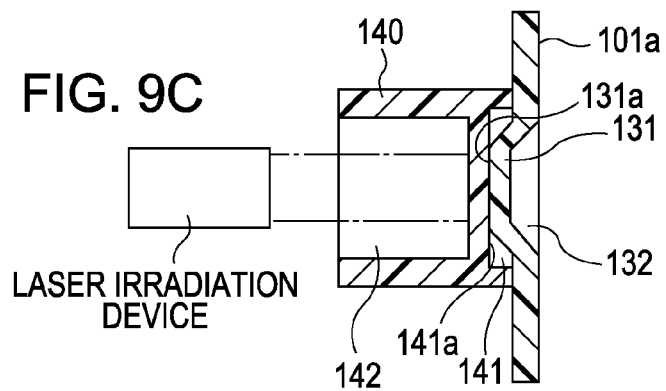

FIGS. 9A to 9D illustrate a method of forming the first shaft portion 101b of the diaphragm blade 101. FIG. 9A shows a first step, FIG. 9B shows a second step, and FIG. 9C shows a third step. The method of forming a second shaft portion 101c is similar to the method of forming the first shaft portion 101b, and hence, the description is omitted.

In FIGS. 9A to 9C, the blade base 101a made of the laser absorptive resin and having the protruding weld portion 131 on the surface is fabricated by pressing, and the cylindrical member 140 made of the laser transmissive resin and having the first recess 141 and the second recess 142 on both end surfaces is fabricated. Then, using a positioning member (not shown), the cylindrical member 140 comes into contact with the blade base 101a so that the first recess 141 and the protruding weld portion 131 are substantially coaxially located (first step, in FIG. 9A). Then, using an assembling tool (not shown), the recess 132 of the blade base 101a is pressed to the first recess 141 of the cylindrical member 140 (in a direction indicated by an arrow in the drawing), so that the contact surface 131a of the protruding weld portion 131 comes into contact with the contact surface 141a of the first recess 141 (second step, in FIG. 9B). Although the contact surface 131a of the protruding weld portion 131 does not come into contact with the contact surface 141a of the first recess 141 in a normal state (FIG. 9A) under the above-mentioned relationship of h1>h2, by pressing the protruding weld portion 131 to the first recess 141, the blade base 101a is elastically deformed, and the contact surface 131a of the protruding weld portion 131 comes into contact with the contact surface 141a of the first recess 141 accordingly.

Figure 9D:
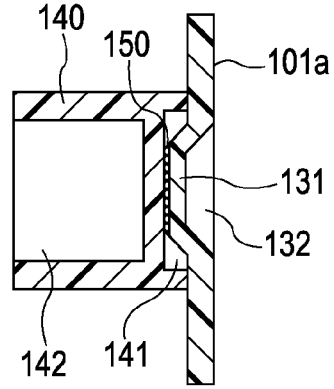

Then, the cylindrical member 140 is irradiated with laser beams of a laser irradiation device from the second recess 142 side of the cylindrical member 140 while the contact surface 131a of the protruding weld portion 131 comes into contact with the contact surface 141a of the first recess 141 (third step, in FIG. 9C). Since the cylindrical member 140 is made of the laser transmissive resin, the laser beam is transmitted through the cylindrical member 140, and then is emitted on the contact surface 131a of the protruding weld portion 131. The laser beam emitted on the contact surface 131a of the protruding weld portion 131 allows the contact surface 131a of the protruding weld portion 131 to be melted, and thereby, the protruding weld portion 131 is welded to the cylindrical member 140. At this time, a weld layer 150 is formed between the protruding weld portion 131 and the cylindrical member 140 (FIG. 9D). Accordingly, the adherence between the contact surface 131a of the protruding weld portion 131 and the contact surface 141a of the first recess 141 can be enhanced. Also, since the recess 132 is formed on the back side of the protruding weld portion 131, resin would not protrude from the back surface of the blade base 101a, which serves as a sliding surface for the cam member 8 in FIG. 1, and therefore, the sliding condition between the cam member 8 and the diaphragm blade 101 can be reliably maintained. Further, since the cylindrical member 140 is made of the laser transmissive resin, attenuation of the laser beam when being transmitted through the cylindrical member 140 can be minimized. Thus, the contact surface 131a of the protruding weld portion 131 can be efficiently welded to the contact surface 141a of the first recess 141.

Thereafter, when the weld layer 150 formed between the contact surface 131a and the contact surface 141a is set, the first shaft portion 101b is fixed to the blade base 101a in a pressurized manner. Accordingly, the first shaft portion 101b is stably fixed to the blade base 101a without being loose against the blade base 101a.

With this embodiment, since the blade base 101a is made of the laser absorptive resin, whereas the cylindrical member 140 is made of the laser transmissive resin, and the blade base 101a is welded to the cylindrical member 140 with the laser beam transmitted through the cylindrical member 140, the shaft portion can be easily formed at even the thin blade base. Thus, the apparatus can be reduced in size, and the dimensional accuracy can be enhanced. Also, since the shaft portion is formed by welding using the laser beam, no protrusion is generated at the back side of the shaft portion of the blade base, as compared with a shaft portion formed on a blade sheet by mechanically pressing, or by outset molding using resin. Accordingly, the sliding condition between the cam member 8 and the diaphragm blade 101 can be reliably maintained.

In this embodiment, while the cylindrical member 140 has the first recess 141 defined in the one end of the cylindrical member 140 near the blade base 101a and coming into contact with the protruding weld portion 131, and the second recess 142 provided on the other end, it is not limited thereto. The cylindrical member 140 may have only the first recess 141 provided on the one end of the cylindrical member 140 near the blade base 101a and coming into contact with the protruding weld portion 131.

Third Embodiment

A light quantity controller having diaphragm blades according to a third embodiment of the present invention is described. The light quantity controller of the third embodiment is different from the light quantity controller of the first embodiment only for the diaphragm blades. The basic configuration of the light quantity controller of the third embodiment is similar to that shown in FIG. 1, and hence, the description is omitted.

Hereinafter, the relationship between a blade base 201a and a first shaft portion 201b of a diaphragm blade 201 according to the third embodiment is described in detail.

Figure 10:
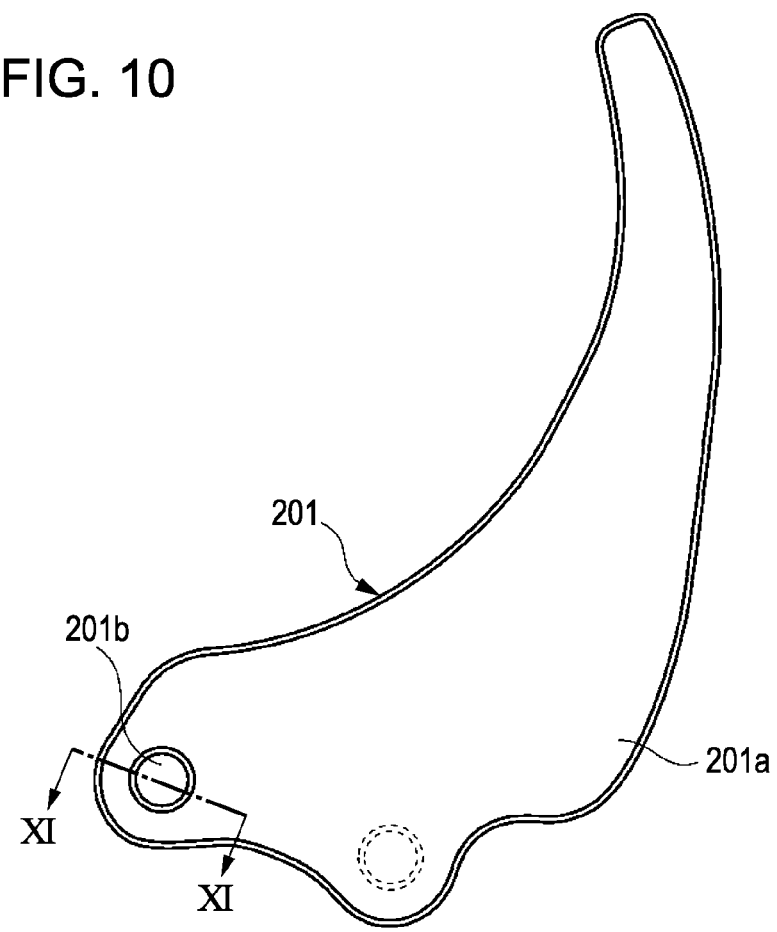
FIG. 10 is a plan view showing a diaphragm blade according to a third embodiment.
Figure 11:
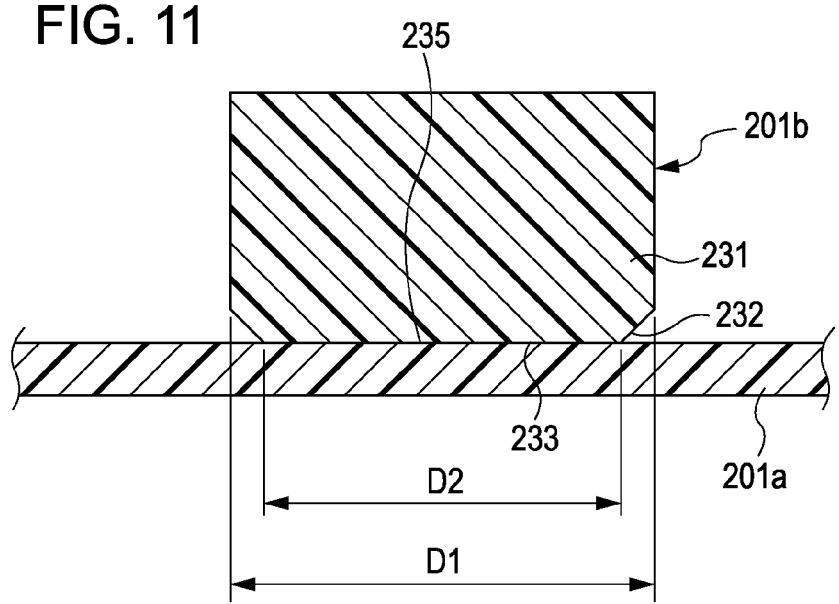
FIG. 11 is a fragmentary cross-sectional view showing the diaphragm blade according to the third embodiment, taken along a line XI-XI in FIG. 10.

FIG. 10 is a plan view showing the diaphragm blade 201 applied to the configuration in FIG. 1. FIG. 11 is a fragmentary cross-sectional view showing the diaphragm blade 201 taken along a line XI-XI in FIG. 10. Referring to FIGS. 10 and 11, the relationship between the blade base 201a and the first shaft portion 201b is described below.

Referring to FIGS. 10 and 11, the blade base 201a has a light-shielding property. The first shaft portion 201b is jointed to the blade base 201a. In particular, the blade base 201a is fabricated by pressing and punching a sheet member made of laser absorptive resin, such as a material mainly composed of polyethylene terephthalate containing, for example, black paint. The first shaft portion 201b is molded with laser transmissive resin, for example, a material which is transparent, natural grade polycarbonate (without filling of other articles such as carbon).

The first shaft portion 201b has a chamfered portion 232 at an end portion 231 that is joined to the blade base 201a. In this embodiment, the chamfered portion 232 is formed by chamfering. The first shaft portion 201b is a solid member (solid column) having a circular cross section. A first shaft portion 201b has a contact surface 233 at the end portion 231 that is joined to the blade base 201a, the contact surface 233 coming into contact with the blade base 201a. Assuming that D2 is a diameter of the contact surface 233, and D1 is an outer diameter of the first shaft portion 201b, the diameter D2 of the contact surface 233 is smaller than the outer diameter D1 of the first shaft portion 201b. The outer diameter D1 is an effective value when the first shaft portion 201b is fitted to a hole of a plate as the rotation center.

In the diaphragm blade 201 thus configured, to weld (join) the first shaft portion 201b to the blade base 201a, the first shaft portion 201b is held at a predetermined position of the blade base 201a while the contact surface 233 of the first shaft portion 201b comes into contact with the principal surface of the blade base 201a, and then, the laser beam is emitted on the blade base 201a from above the first shaft portion 201b for a predetermined time.

The laser beam emitted from above the first shaft portion 201b is transmitted trough the first shaft portion 201b of the laser transmissive resin, and then emitted on the blade base 201a. Accordingly, an irradiation spot is formed on the blade base 201a (on the thin-plate member), and the laser beam is absorbed by the blade base 201a of the laser absorptive resin. At this time, the irradiated surface (irradiation spot) of the blade base 201a generates heat. With the heat, the blade base 201a reaches the melting point of the resin, and is melted. Also, the heat is transmitted from the contact surface 235 of the blade base 201a to the contact surface 233 of the first shaft portion 201b. Accordingly, the contact surface 233 of the first shaft portion 201b is heated and melted. At this time, the melted resin does not protrude from the outer periphery of the first shaft portion 201b, and stays at a gap between the chamfered portion 232 and the blade base 201a. As a result, the melted part of the blade base 201a and that of the first shaft portion 201b are fused, the melted parts are set as the temperature decreases after the irradiation of the laser beam is stopped, and hence, the blade base 201a and the first shaft portion 201b are integrally welded.

In many cases of welding using the laser beam or the like, it is necessary to carefully consider the welding condition so as to realize stable mass production. In particular, the condition may include the appropriate laser output and laser irradiation time, so as to correspond to the material and combination of materials for a workpiece, and variations in materials and shapes.

Next, the laser welding condition suitable for fabricating the diaphragm blade 201 is described.

Tables 3 and 4 show the melted states of the blade base 201a and the first shaft portion 201b when the first shaft portion 201b made of polycarbonate (melting point: about 225° C.) as the laser transmissive resin was welded to the blade base 201a made of a material mainly composed of polyethylene terephthalate containing a light-shielding member (melting point: about 255° C.) as the laser absorptive resin. The welding was performed under the conditions in which semiconductor laser was used as the laser beam, the irradiation time was set constant (for example, 1 second), and the laser output was varied.

First, the experimental result of an example is shown in Table 3. This is a case in which the shape of the first shaft portion is a solid column, and the outer diameter of the contact surface is smaller than the outer diameter of the first shaft portion (with a chamfered portion).

TABLE 3

| | Laser output (W) | | | | | | |
|---|---|---|---|---|---|---|---|
| | 11.0 | 12.0 | 13.0 | 14.0 | 15.0 | 16.0 | 17.0 |
| Melted state of first shaft portion | Δ | O | O | O | X | X | X |
| Melted state of blade base | Δ | Δ | Δ | O | O | O | X |
| Result of observation | NG | NG | NG | OK | NG | NG | NG |

Irradiation time: 1 second, first shaft portion: with chamfered portion

In Table 3, "Δ" represents that the melted state of the contact surface of the blade base or the first shaft portion was insufficient, "X" represents the occurrence of deformation, expansion, or perforation in each part except the contact surface because of the excessively melted state, and "O" represents a good melted state with a given welding force. "OK" represents that welding was successfully accomplished between the blade base and the first shaft portion.

Next, the experimental result of a comparative example is shown in Table 4. This is a case in which the shape of a first shaft portion is a solid column, and the outer diameter of a contact surface is equivalent to the outer diameter of the first shaft portion (without a chamfered portion).

TABLE 4

| | Laser output (W) | | | | | | |
|---|---|---|---|---|---|---|---|
| | 11.0 | 12.0 | 13.0 | 14.0 | 15.0 | 16.0 | 17.0 |
| Melted state of first shaft portion | Δ | O | O | X | X | X | X |
| Melted state of blade base | Δ | Δ | Δ | O | O | O | X |
| Result of observation | NG | NG | NG | NG | NG | NG | NG |

Irradiation time: 1 second, first shaft portion: without chamfered portion

In Table 4, if the outer diameter of the first shaft portion was equivalent to the outer diameter of the contact surface, the melted state of the first shaft portion near the contact surface was insufficient with the laser output of 11 W or lower. With the laser output of 12 or 13 W, the melted state was good. With the laser output of 14 W or higher, the melted state was excessive, so that the melted resin protruded from the outer periphery of the first shaft portion in a radial direction of the first shaft portion, resulting in that the outer diameter of the first shaft portion became larger than the original outer diameter of the first shaft portion. The melted state of the blade base near the contact surface was insufficient with the laser output of 13 W or lower. With the laser output of 14~16 W, the melted state became good. With the laser output of 17 W or higher, perforation occurred in the blade base because of the excessively melted state.

Referring to the result of Table 4, in the case in which the outer diameter of the first shaft portion was equivalent to the outer diameter of the contact surface, the blade base and the first shaft portion were not melted sufficiently only by controlling the laser output emitted on the contact surface, and thus, the given welding strength could not be obtained.

In contrast, referring to Table 3, with the first shaft portion with the chamfered portion provided as shown in FIG. 11, the melted resin did not protrude from the outer periphery of the first shaft portion although the melted resin slightly expands in the radial direction of the first shaft portion with the laser output of 14 W. As a result, the outer diameter of the first shaft portion after the laser welding became equal to or smaller than the original outer diameter of the first shaft portion. Hence, the melted state of the first shaft portion exhibited "O". The melted state of the blade base is similar to that of the blade base shown in Table 4, and the description is omitted.

Referring to the result of Table 3, in the case in which the first shaft portion with the chamfered portion provided as shown in FIG. 11 was used, the welding between the blade base and the first shaft portion was successfully accomplished, and the given welding strength was obtained, with the laser output of 14 W when the laser was emitted on the contact surface for 1 second.

Referring to the results of Tables 3 and 4, in the case in which the shaft member and the blade base made of the different resin materials are welded, since the first shaft portion has the chamfered portion at the axial end thereof, the range of the condition for the successful welding can be widened. Further, since the range of the condition for the laser welding is widened, such range can correspond to variation in control of the laser output, and variation in condition of the parts, thereby realizing the stable mass production in the manufacturing steps of the diaphragm blades.

As described above, with this embodiment, the first shaft portion 201b has the chamfered portion 232 at the end portion 231 which comes into contact with the blade base 201a. Accordingly, when the first shaft portion 201b is welded to the blade base 201a by laser beam, the melted resin stays in the gap between the chamfered portion 232 and the blade base 201a, and would not protrude from the outer periphery of the first shaft portion 201b. Thus, the outer periphery of the first shaft portion 201b can be prevented from being deformed. Also, since the melted resin would not protrude from the outer periphery of the first shaft portion 201b, the range of condition for energy of the laser beam realizing the good melted state can be widened. Further, since the first shaft portion 201b is welded to the blade base 201a with the laser beam, the manufacturing cost for the light-quantity-controlling blades can be reduced. Therefore, the manufacturing cost can be reduced, the dimensional accuracy can be enhanced, and the stable welding can be performed.

In this embodiment, while the first shaft portion 201b is made of the laser transmissive resin, and the blade base 201a is made of the laser absorptive resin, the materials can be interchanged. In particular, the first shaft portion may be made of laser absorptive resin having a light-shielding property, whereas a part of the blade base coming into contact with the first shaft portion may be made of laser transmissive resin. In such a case, a residual part of the blade base not coming into contact with the first shaft portion is coated with or deposited with a light-shielding material. In addition, when the blade base and the first shaft portion are welded, the laser beam is emitted from above the blade base to the first shaft portion. With this configuration, advantages similar to the above-mentioned advantages can be attained.

In this embodiment, while the laser transmissive resin is composed of polycarbonate, it is not limited thereto, and the laser transmissive resin may be a material mainly composed of polycarbonate. Also, the laser transmissive resin and the laser absorptive resin may be composed of materials other than those described above.

Further, in this embodiment, while the chamfered portion 232 is formed by chamfering (C-chamfering), it is not limited thereto, and the chamfered portion may be formed by R-chamfering. Alternatively, a chamfered portion may have any shape as long as a gap is defined between the chamfered portion and the blade base 201a.

Figure 12:
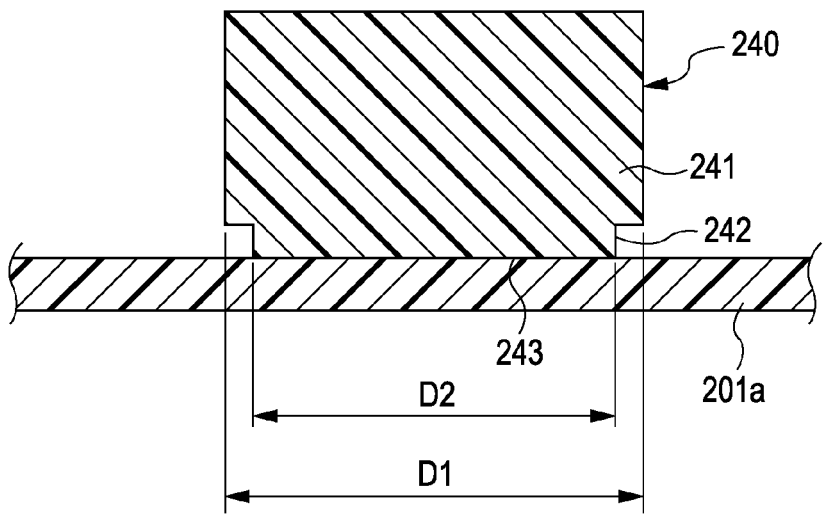
FIG. 12 is an illustration showing a modification of the first shaft portion in FIG. 11.

FIG. 12 is an illustration showing a modification of the first shaft portion 201b in FIG. 11.

In FIG. 12, a first shaft portion 240 has a chamfered portion 242 at an end portion 241 which is welded to the blade base 201a. The chamfered portion 242 has a stepped shape. In addition, the first shaft portion 240 is a solid member (solid column) having a circular cross section. The first shaft portion 240 has a contact surface 243 at an end portion 241 which is joined to the blade base 201a, the contact surface 243 coming into contact with the blade base 201a.

With this modification, since the chamfered portion 242 has the stepped shape, when the first shaft portion 240 is welded to the blade base 201a, the melted resin stays in a gap between the chamfered portion 242 and the blade base 201a and would not protrude from the outer periphery of the first shaft portion 240. Thus, the outer periphery of the first shaft portion 240 can be reliably prevented from being deformed.

Figure 13:
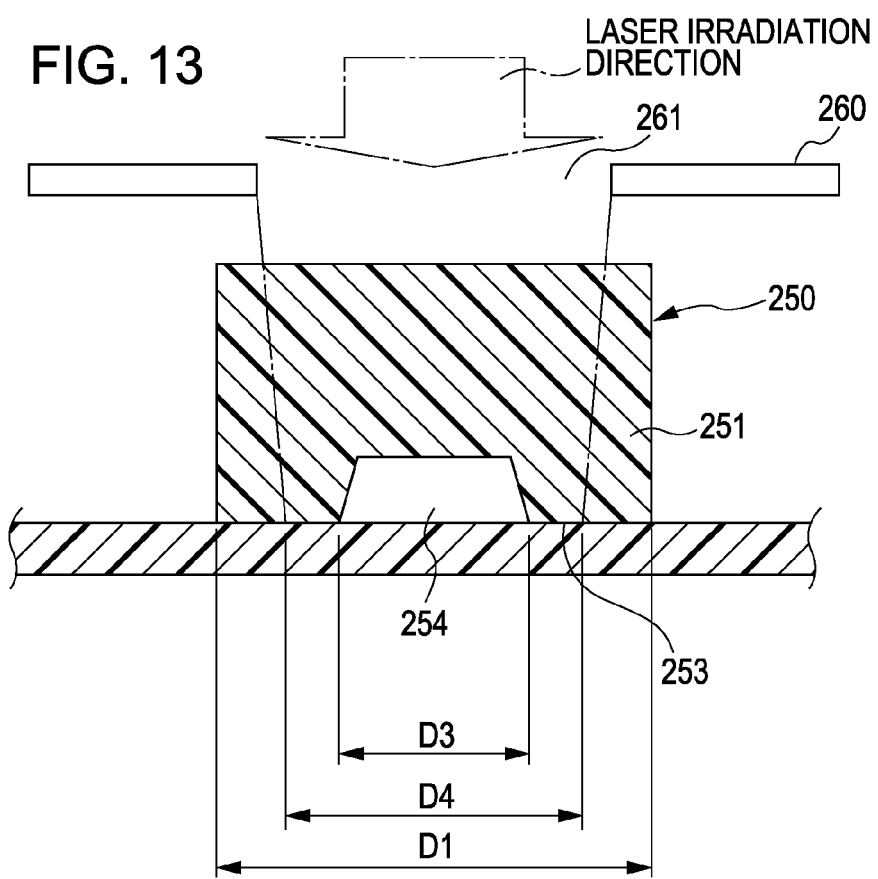
FIG. 13 is an illustration showing another modification of the first shaft portion in FIG. 11.
Figure 14A:
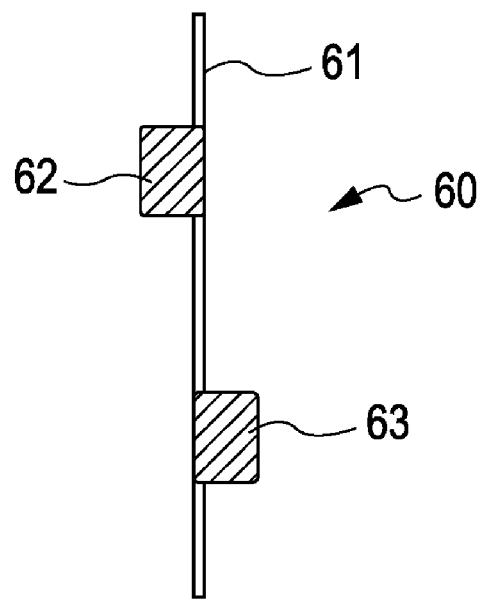
FIGS. 14A and 14B are cross-sectional views showing configurations of diaphragm blades according to related arts.
Figure 14B:
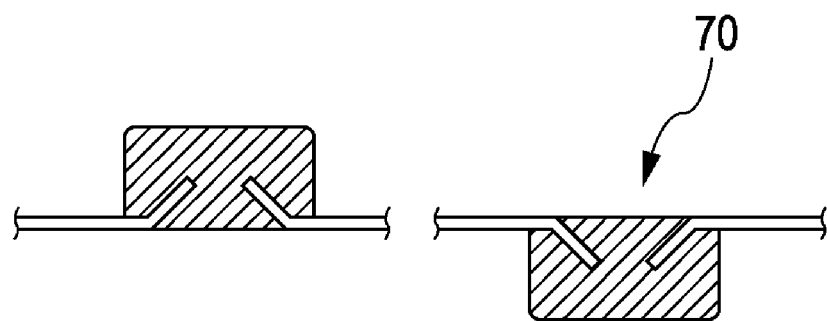

FIG. 13 is an illustration showing another modification of the first shaft portion 201b in FIG. 11.

As shown in FIG. 13, a first shaft portion 250 is a solid member having a circular cross section. The first shaft portion 250 has a contact surface 253 at an end portion 251 which is welded to the blade base 201a, the contact surface 253 coming into contact with the blade base 201a. Also, the contact surface 253 of the first shaft portion 250 has a recess 254.

Hence, the contact surface 253 has a substantially annular shape (ring shape).

In addition, a gate portion (not shown) is provided at the bottom surface of the recess 254, the gate portion which is required when the first shaft portion 250 is molded with resin. With this configuration, the outer surface, upper surface, and contact surface 253 of the first shaft portion 250 do not have a protrusion due to the gate portion, it can be prevented that the protrusion causes the welding to be failed, and causes the operation of the diaphragm blades 201 to be defected.

In the case where the first shaft portion 250 having the above configuration is welded to the blade base 201a, a mask 260 is disposed above the first shaft portion 250, and laser beam passing through a substantially circular hole 261 that is formed in the mask 260 is emitted on the first shaft portion 250. At this time, an outer diameter D4 of an irradiation spot of the laser beam on the diaphragm blade 201 satisfies the relationship of D3<D4<D1, where D1 is an outer diameter of the first shaft portion 250 and D3 is an inner diameter of the recess 254. The laser beam passing through the hole 261 of the mask 260 is emitted only on a center portion of the contact surface 253, but not on an outer peripheral portion. Accordingly, an inner peripheral portion of the contact surface 253 is melted by the laser beam, and the melted resin protrudes to the inner space of the recess 254. However, the outer peripheral portion of the contact surface 253 is not melted, and the melted resin protruding from the outer peripheral portion of the blade base 201a does not protrude.

With this modification, since the recess 254 is provided at the contact surface 253 of the first shaft portion 250, when the first shaft portion 250 is welded to the blade base 201a using the laser beam, the melted resin stays in the recess 254, and does not protrude from the outer peripheral portion of the first shaft portion 250. Thus, the outer peripheral portion of the first shaft portion 250 can be reliably prevented from being deformed. In addition, since the laser beam is emitted on the first shaft portion 250 such that the diameter of the irradiation spot on the blade base 201a becomes D4 (D3>D4>D1), the outer peripheral portion of the contact surface 253 is not melted, and thus, the outer peripheral portion of the first shaft portion 250 can be further reliably prevented from being deformed.

In this modification, while the recess 254 is provided at the contact surface 253 of the first shaft portion 250, it is not limited thereto. The recess 254 does not have to be provided at the contact surface 253 of the first shaft portion 250. In such a case, the inner diameter D4 of the hole 261 formed in the mask 260 may be set to a value that satisfies the relationship of D4<D1, where D1 is the outer diameter of the first shaft portion 250.

Further, in this modification, while the mask 260 is used when the center portion of the first shaft portion 250 is irradiated with the laser beam, it is not limited thereto. An optical system, such as a lens, may be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-044038 filed Feb. 23, 2007, No. 2007-102062 filed Apr. 9, 2007, and No. 2007-173088 filed Jun. 29, 2007, which are hereby incorporated by reference herein in its their entirety.

What is claimed is:

1. A light quantity controller comprising:
a diaphragm blade; and
a drive source configured to drive the diaphragm blade,
wherein the diaphragm blade includes a thin-plate blade member and a shaft member provided at least on one surface of the blade member, the blade member being made of laser absorptive resin, the shaft member being made of laser transmissive resin, the blade member being welded to the shaft member with laser beam transmitted through the shaft member, and
wherein a melting point of the laser transmissive resin is lower than a melting point of the laser absorptive resin.

2. The light quantity controller according to claim 1,
wherein the difference between the melting point of the laser transmissive resin and the melting point of the laser absorptive resin is less than 20° C.

3. The light quantity controller according to claim 2,
wherein the blade member is made of a material mainly composed of polyethylene terephthalate, and the shaft member is made of a material mainly composed of polycarbonate containing a glass material.

4. The light quantity controller according to claim 1,
wherein the protrusion has a first contact surface coming into contact with the recess, and the recess has a second contact surface coming into contact with the protrusion, and
wherein the blade member is welded to the shaft member while the first contact surface comes into contact with the second contact surface by pressing the protrusion to the recess.

5. The light quantity controller according to claim 1,
wherein the blade member has another recess formed on the back side of the protrusion.

6. A light quantity controller comprising:
a diaphragm blade; and
a drive source configured to drive the diaphragm blade,
wherein the diaphragm blade includes a thin-plate blade member and a shaft member provided at least on one surface of the blade member, the blade member being made of laser absorptive resin, the shaft member being made of laser transmissive resin, the blade member being welded to the shaft member with laser beam transmitted through the shaft member,
wherein the blade member has a protrusion on a surface thereof and the shaft member has a recess at an end thereof facing the blade member, and
wherein the blade member is welded to the shaft member by irradiating the protrusion with the laser beam transmitted through the shaft member while the protrusion comes into contact with the recess.

7. The light quantity controller according to claim 6,
wherein the following condition is satisfied:

$$h1 > h2$$

where h2 is a protruding length of the protrusion from the surface of the blade member, and h1 is a depth of the recess from the end of the shaft portion.

8. A method of manufacturing a diaphragm blade, the diaphragm blade including a thin-plate blade member and a shaft member provided at least on one surface of the blade member, the method comprising:
fabricating the blade member with laser absorptive resin and having a protrusion on a surface thereof;
fabricating the shaft member with laser transmissive resin and having a recess at least at an end thereof; and
welding the blade member to the shaft member by irradiating the protrusion with laser beam transmitted through the shaft member while the protrusion comes into contact with the recess.

9. The method of manufacturing the diaphragm blade according to claim 8,
wherein a melting point of the laser transmissive resin is lower than a melting point of the laser absorptive resin.

10. The method of manufacturing the diaphragm blade according to claim 9,
wherein, the difference between the melting point of the laser transmissive resin and the melting point of the laser absorptive resin is less than 20° C.

11. The method of manufacturing the diaphragm blade according to claim 10,
wherein the blade member is made of a material mainly composed of polyethylene terephthalate, and the shaft member is made of a material mainly composed of polycarbonate containing a glass material.

12. A light quantity controller comprising:
a diaphragm blade; and
a drive source configured to drive the diaphragm blade,
wherein the diaphragm blade includes a light-shielding thin-plate member and a shaft member joined to the thin-plate member with laser beam, the shaft member being made of laser transmissive resin, the thin-plate member being made of laser absorptive resin, the shaft member having a chamfered portion at an end portion thereof which is joined to the thin-plate member,
wherein the shaft member is a solid member having a circular cross section, and has a contact surface coming into contact with the thin-plate member at the end portion which is joined to the thin-plate member, the contact surface having a diameter smaller than an outer diameter of the shaft member, and
wherein the laser beam forms an irradiation spot on the thin-plate member by being emitted on the thin-plate member after being transmitted through the shaft member, and an outer diameter $D4$ of the irradiation spot is a value that satisfies the relationship of $D4<D1$, where $D1$ is an outer diameter of the shaft member.

13. The light quantity controller according to claim 12, wherein the chamfered portion has a stepped shape.

\* \* \* \* \*